Sept. 15, 1942.　　A. E. GRATER ET AL　　2,295,896
DRIVE ASSEMBLY
Filed June 26, 1940　　3 Sheets-Sheet 1
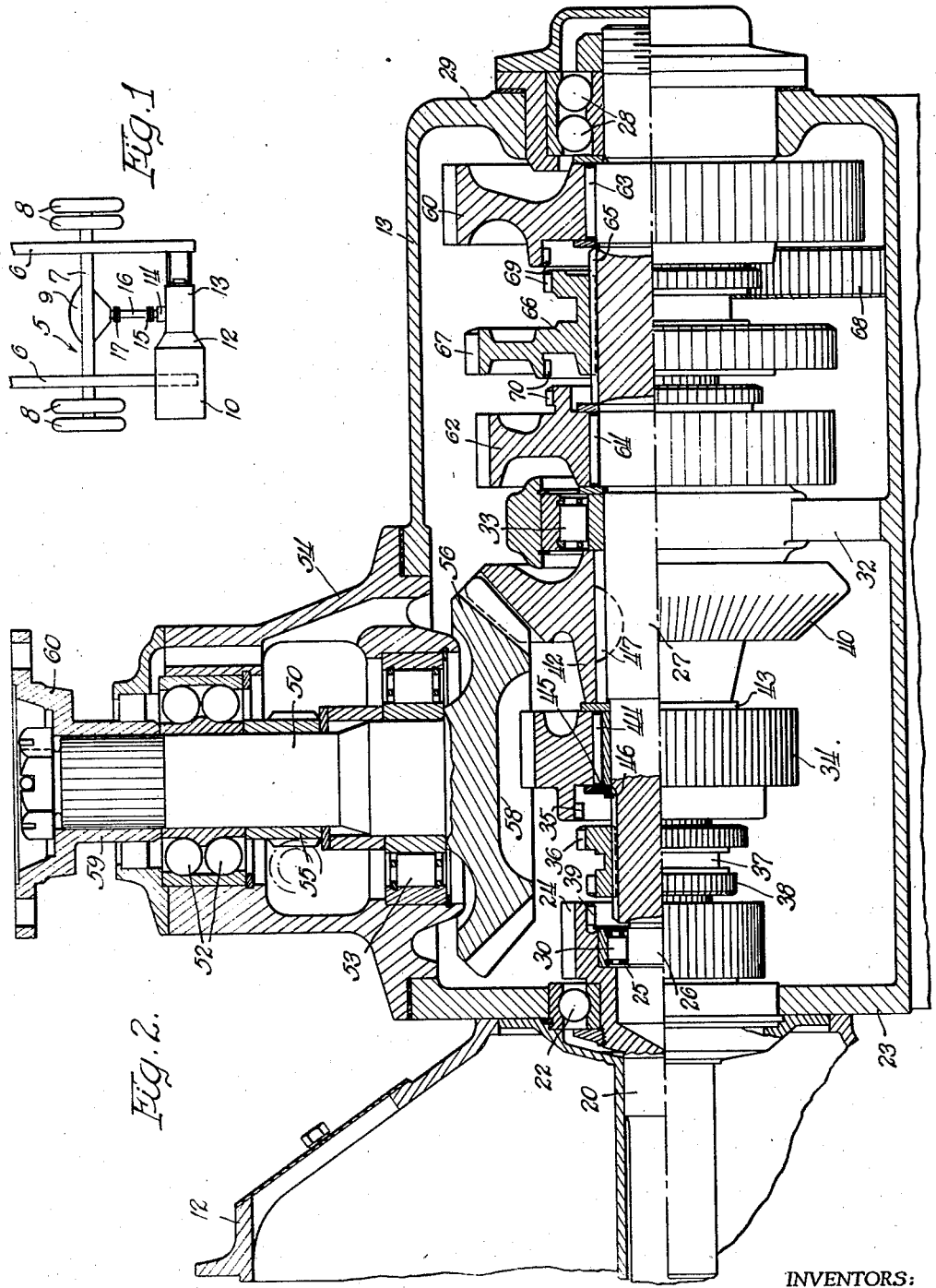
INVENTORS:
Walter E. Schirmer,
Alfred E. Grater,
BY Walter E. Schirmer
ATTORNEY.

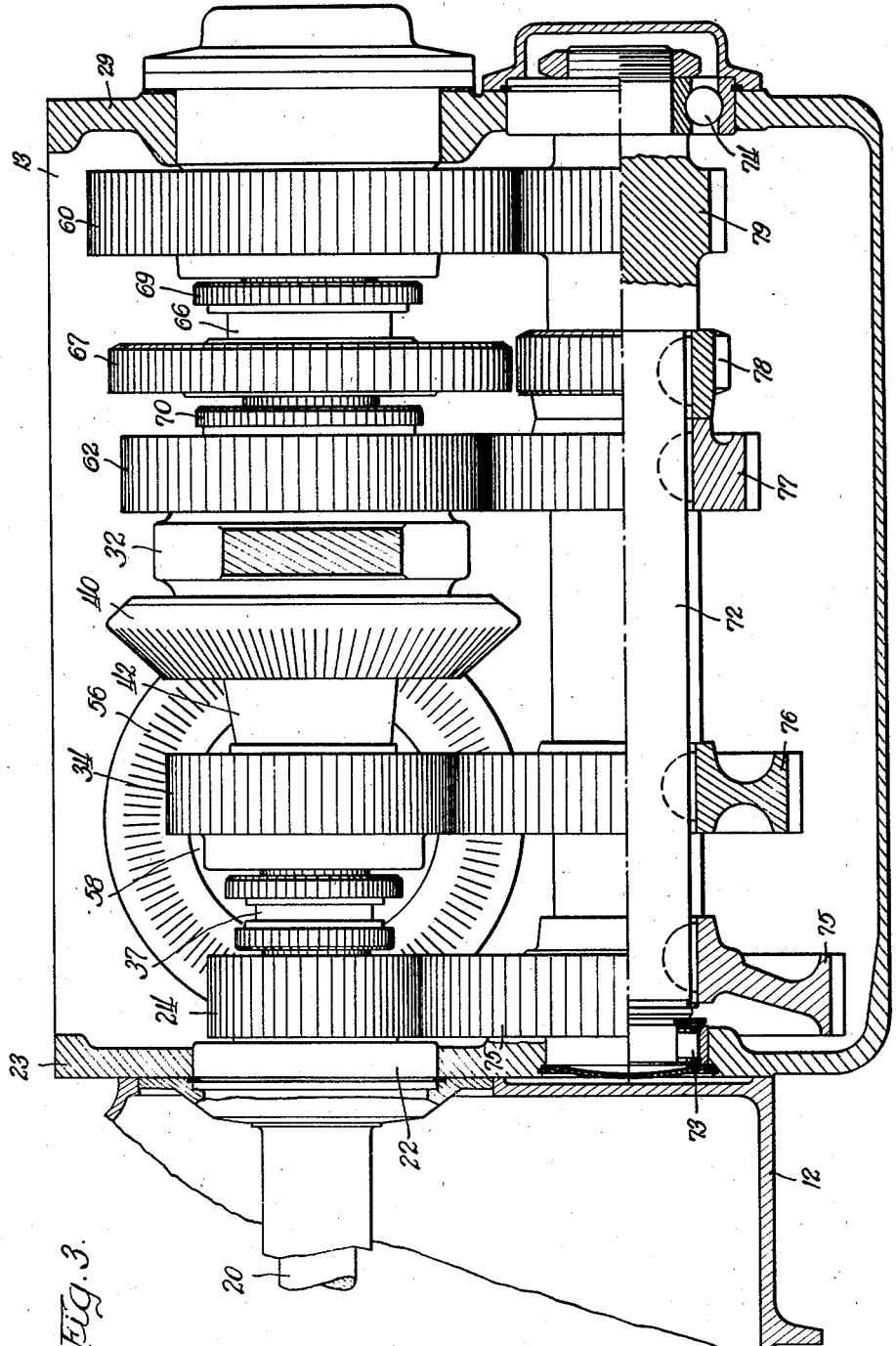

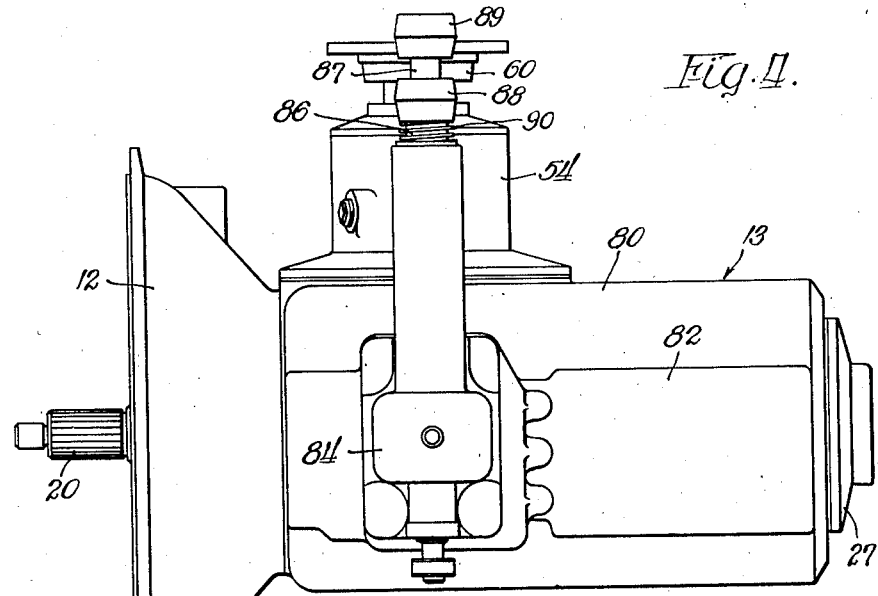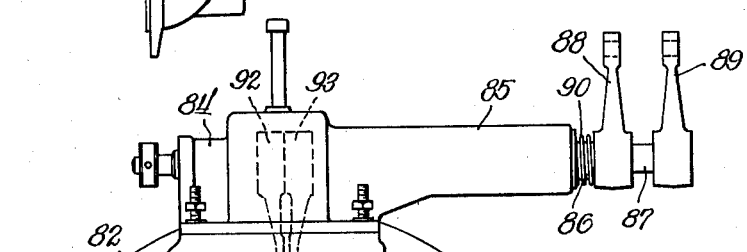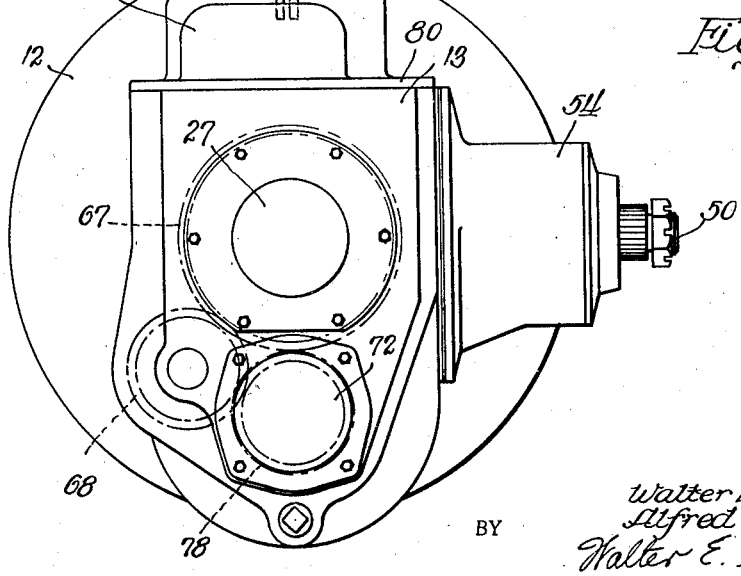

Patented Sept. 15, 1942

2,295,896

UNITED STATES PATENT OFFICE 2,295,896

DRIVE ASSEMBLY

Alfred E. Grater, Niles, and Walter E. Schirmer, Buchanan, Mich., assignors to Clark Equipment Company, Buchanan, Mich., a corporation of Michigan Application June 26, 1940, Serial No. 342,462

9 Claims. (Cl. 180—54)

This invention relates to a drive assembly for motor vehicles, especially busses, trucks and the like, in which the power unit is mounted at the rear end of the chassis of the vehicle with the driver being stationed forwardly.

In such constructions, considerable difficulty has arisen in providing for the connection of the power unit to the rear drive axle which is located forwardly thereof. This has especially been true in connection with engines which are mounted transversely of the vehicle at the rear end thereof, and in which the transmission is secured directly to the bell housing with the shafts of the transmission extending parallel to the driving axle.

One attempt to overcome such difficulty has been the provision of an angle drive between the rear end or outlet end of the transmission and the differential of the driving axle located centrally of the axle. Other attempts have included the use of a bevel gear connection to a differential which is offset from the center of the axle housing. This eliminates the use of a production type housing, and necessarily increases the cost of the unit. Still other attempts to solve this problem have resulted in employing a quill shaft over-lying the main transmission shaft and carrying at its forward end a bevel gear which is adapted to drive a right angled shaft connected to the propeller shaft. Other devices such as employing a bevel gear set driven from the countershaft have also been utilized in attempting to solve this problem.

The present invention contemplates a construction in which the major portion is made up of standard parts and standard gears, thereby reducing materially the cost of the drive assembly, and at the same time, materially assisting in servicing of the same as well as in providing for the use of a standard axle housing.

In the present construction, a conventional clutch drive shaft is employed into which is journalled the end of a conventional type of transmission main shaft. Carried on this main shaft are the conventional gears of a four-speed transmission, with the second and third speed gears separated axially to provide for locating a radial bearing for the shaft and a bevel gear intermediate the radial bearing and the third speed gear. Extending laterally into the side of the transmission case is a pinion shaft carrying a mating bevel gear at its end, which is driven from the bevel gear on the transmission main shaft, and in turn is connected to the pinion shaft of the differential.

Another feature of the present invention is the simplicity with which the same can be assembled and connected to the drive shaft and its adaptation for use for a large number of various types of rear engine drive vehicles.

Another feature of the present invention is the provision of a transmission in which two gear trains are provided between the countershaft and main shaft forwardly of the bevel gear, with a sliding clutch therebetween, and the longitudinal space required by the bevel gear in the transmission case on the output shaft is such as to accommodate these gear trains and clutch along the main shaft. Thus the present design makes use of this longitudinal distance required for the two gear trains to receive the output gearing, this gearing having its end face suitably recessed so as to accommodate a relatively large main shaft gear, giving the desired ratios in the gear trains and still conserving longitudinal extension of the case so as to conpact the design and provide as near an on-center drive to the axle as possible.

Other objects and advantages of the present invention will be more apparent from the following detailed description which, taken in conjunction with the accompanying drawings, will disclose to those skilled in the art the particular construction and mode of operation of the present invention.

In the drawings:

Figure 1 is a schematic view showing the relationship of the present drive assembly to the chassis of the vehicle;

Figure 2 is a transverse sectional view taken through the transmission, and laterally extending drive take-off;

Figure 3 is a vertical sectional view through the transmission and drive assembly shown in Figure 2;

Figure 4 is a top plan view of the assembly with the control mechanism in position; and Figure 5 is a rear end view of the structure and control mechanism.

Referring now in detail to the drawings, in Figure 1 we have shown a vehicle chassis indicated generally at 5, having the parallelly extending side frame members 6 which are spring supported upon the drive axle 7 having the dual wheels 8 at opposite ends thereof. The drive axle 7 is provided with a banjo portion carrying the differential carrier 9 as near centrally thereof as possible, depending upon the size of the engine and drive assembly. In the illustrated embodiment, this is shown as a center drive axle, altho not limited thereto.

Mounted at the rear end of the side rails 6 is a power plant and drive assembly unit comprising the engine 10 having the bell housing 12 in which is disposed a conventional type vehicle clutch to which is secured the transmission case 13. This unit is preferably supported by suitable cross members tied between the extending ends of the chassis frame 6, and projecting laterally forwardly from the transmission case 13 is an offset housing or cap member 14 within which is disposed a longitudinally extending drive shaft connected through the joint 15 to a propeller shaft 16, which in turn is connected by the joint 17 to the pinion shaft of the differential mounted in the carrier 9. It will thus be apparent that the drive from the engine 10 is taken through the transmission and then directly through the longitudinal central plane of the vehicle forwardly to the axle. It will also be apparent that the clutch is located forwardly of the transmission, and consequently takes care of only the torque of the motor. This is more desirable than having it mounted at the opposite end of the transmission, as is customary in some cases where a central type of drive is required.

Considering now the details of the transmission and drive assembly, as shown in Figures 2 and 3, the clutch shaft 20 is adapted to be rotatably supported by bearings 22 in the front wall 23 of the transmission case 13, and within the transmission. The shaft is enlarged to provide the radially enlarged gear portion 24 and the recessed portion 25. Within the recessed portion 25 is journalled the small end 26 of a transmission main shaft 27. This shaft at its opposite end is supported by bearings 28 in the rear wall 29 of the transmission case, the bearings 28 being adapted to take axial loads, while the bearing 30 journalling the stub end of the shaft within the gear 24 is adapted to take only radial loads.

Intermediate its ends the transmission shaft 27 is provided with an intermediate bearing support, including a bearing journal 32 extending inwardly from the side walls of the transmission case and adapted to enclose the roller bearings 33 which provide for taking additional radial loads adjacent the center of the transmission main shaft.

Rotatably mounted on the shaft 27 adjacent its forward end is the third speed gear 34 which has the internal clutch tooth portion 35 adapted to be engaged by the clutch teeth 36 of the clutch sleeve 37 for coupling the gear 34 to the shaft 27. When the sleeve 37 is moved in the opposite direction, the clutch teeth 38 thereof engage the internal clutch teeth 39 of clutch shaft gear 24, providing a direct driving connection between the clutch shaft 20 and the transmission shaft 27.

Mounted on the transmission shaft 27 intermediate the bearing support 33 and the rotatable gear 34 there is provided a bevel gear 40 having a tapered hub portion 42 which, at one end, abuts against the retaining ring 43 carried on the shaft 27, and forming a stop limiting axial movement of the gear 34 in one direction. The gear 34 in turn is prevented from axial movement in the opposite direction by the provision of a washer 45 contacting the hub of the gear and engaged by the snap ring 46 located in a groove in shaft 27, thereby confining the gear 34 against axial movement, while yet allowing free rotation thereof on the bearings 44.

The gear 40 is preferably keyed for conjoint rotation with the shaft 27 by means of the key 47, whereby the gear 40 is rotated whenever the shaft 27 is rotated, and thus driving torque can be taken from this gear. Extending in a direction at right angles to the axis of the shaft 27 is an output shaft 50 which is journalled as by means of thrust bearings 52 and radial bearings 53 within the bearings sleeve 54 bolted to the side face of the transmission case 13. The shaft 50 intermediate its ends is provided with a small gear 55 for operating the speedometer of the vehicle. At its inner end adjacent the radial bearings 53, the shaft 50 is provided with the integral bevel gear member 56 which has meshing engagement with the gear 40 carried by the shaft 27, and also is provided with a recessed end portion 58 whereby clearance is provided with respect to the gear 34.

At its opposite end the shaft 50 is provided with a splined portion receiving the hub 59 of a companion flange 60 of the universal joint 15.

On the opposite side of the radial load supporting bearing 33 there is provided the first and second speed gears 60 and 62, respectively, which are rotatably journalled by bearings 63 and 64 upon the main shaft 27, the intermediate portion of the shaft between the gears being splined as indicated at 65 to receive the clutch gear 66 which in turn is provided with the external tooth portion 67 for effecting reverse drive through the transmission when the reverse gear 68 is shifted axially into engagement with the gear 67. The clutch sleeve 66 when axially shifted in opposite directions, selectively couples the gear 60 to the shaft 27 through clutch teeth 69 or the gear 62 to shaft 27 through clutch teeth 70.

It will therefore be apparent with the construction thus far described that the transmission main shaft is journalled at one end directly in the conventional clutch shaft of a standard power unit assembly, and at its opposite end is carried by thrust bearings 28 which absorb any axial thrusts upon the shaft 27.

The shaft intermediate its ends is supported by the roller bearings 33 which are capable of taking the radial loads imposed upon the shaft by reason of the bevel gear drive through gears 40 and 56. In addition, the main shaft carries the conventional clutch sleeves 37 and 66 and the conventional gearing for a standard type of four-speed transmission. Thus, it will be apparent that the cost of the present construction is materially reduced because of the possibility of using standard parts which can be taken from production jobs.

It will be noted that the power output shaft 50 is supported against radial loads adjacent the gear 56 by the bearings 53, while the bearings 52 locate the shaft with respect to possible axial thrusts. Considering now the structure shown in Figure 3, this merely discloses the relationship of the countershaft to the transmission main shaft. In this drawing, the countershaft 72 is provided which is journalled at one end in the radially loaded bearings 73 and at the opposite end is journalled by the thrust bearings 74 located in the end wall 29 of the transmission case. The countershaft 72 is disposed below the main shaft 27 and is adapted to carry thereon the gear 75 which meshes with the clutch shaft gear 24. Similarly, the countershaft is provided with the gear 76 meshing with the gear 34 or third speed gear of the transmission, and is also provided with the gear 77 meshing with the second speed gear 62 of the transmission.

Disposed substantially in radial alinement with the gear portion 67 of the clutch sleeve 66, the countershaft is provided with a gear 78 which is adapted to be engaged by the reverse gear 68 interposed between the gear portions 67 and the gear 78 to effect reverse drive through the main shaft. Adjacent the thrust bearing end of the countershaft 72 there is preferably formed an integral gear portion 79 which is in meshing engagement with the gear 60 or first speed gear of the transmission. Preferably, these gears are all of the constant mesh helical tooth type, and all shifting is effected by means of the clutch sleeves 37 and 66, or reverse drive when the gear 68 is shifted.

Referring now to Figures 4 and 5, we have disclosed therein the clutch and transmission assembly provided with a gear selecting and shifting control. In this particular embodiment of the invention the upper portion or top of the transmission case 13 is covered by a closure member 80 which has the longitudinally extending raised portion 82 within which are mounted a plurality of shift rails, there preferably being three parallelly mounted relatively shiftable rails disposed in substantially horizontal alinement in the housing 82. Disposed forwardly of the shift rail housing 82 is the control housing 84 mounted thereon and having the extending tubular arm portion 85 within which is disposed the telescoping shafts 86 and 87, each provided at their outer ends with rock arms 88 and 89, respectively. The shaft 86 is normally urged outwardly of the sleeve 85 by means of the coil spring 90 extending thereabout between the end of the sleeve 85 and the arm 88. Within the control housing 84 there is provided two shifter arms or lugs 92 and 93 connected respectively to the shafts 86 and 87. It will be apparent that when the shaft 86 is telescoped inwardly of the tubular arm 85 compressing the spring 90, the shifter lug 92 will be moved to the left, as viewed in Figure 5, to engage the shifter rail and shift fork controlling operation of the reverse gear. However, the details of the shift control for this particular type of power assembly can be more or less conventional, and it is therefore not believed that a further detailed description thereof is necessary.

It is therefore believed apparent that with the present drive assembly, a rear engine mounting for driving an axle disposed forwardly thereof and having a centrally located differential is readily provided at a minimum amount of cost, since the majority of parts provided in the drive through the clutch and transmission are of conventional style and use standard parts. Further, the construction is much cheaper than the use of a quill shaft or similar arrangement for taking out a right angle drive from the forward part of the transmission.

We are aware that various changes may be made in certain details of the present construction, and therefore do not intend to limit ourselves as defined by the scope and spirit of the appended claims.

We claim:

1. In combination, a power unit, clutch and transmission coupled together in a rigid assembly, a housing for said transmission, a clutch shaft in said clutch having a drive gear portion extending into said transmission housing, a transmission main shaft journalled at one end in said drive gear portion, thrust bearings supporting the opposite end of said main shaft in the end wall of said housing, a plurality of axially spaced gears on said main shaft including a bevel gear, a radially loaded bearing in said housing for said shaft adjacent to and on the posterior side of said bevel gear, an output shaft extending laterally out of said transmission at an angle to said main shaft, and a bevel gear on said output shaft axially overlying said drive gear portion and driven from said bevel gear on said main shaft.

2. In combination, a power unit, clutch unit and transmission extending in rigid coupled relation, a clutch shaft having one end extending into said transmission, a transmission main shaft journalled at one end in said clutch shaft, thrust bearing means journalling the other end of said main shaft, a radial load supporting bearing for said shaft intermediate its ends, a bevel gear keyed to said main shaft between said clutch shaft and said intermediate bearing, a rotatably journalled output shaft extending normal to said main shaft and driven from said bevel gear, and gear clutch means on said main shaft on each side of said bevel gear.

3. A rear engine drive vehicle including a driving axle having a rearwardly projecting differential, a transmission disposed transversely of the vehicle rearwardly of the axle and having a main shaft paralleling said axle, a series of change speed gears on said main shaft, a radial bearing intermediate the ends of said shaft separating said change speed gears, a bevel gear keyed on said main shaft anterior to said bearing, a propeller shaft extending between said differential and the side of said transmission, and means extending into said transmission including a second bevel gear axially overlying the change speed gears on the anterior side of said bearing for driving said propeller shaft from said first bevel gear.

4. A transmission for a rear engine drive vehicle, said transmission extending transversely of the vehicle, comprising a housing having parallel end walls, a main shaft and a countershaft, change speed gearing between said shafts, a clutch shaft extending into one end wall of said transmission housing and having a journal for one end of said main shaft, means on said clutch shaft for driving said countershaft, a main shaft thrust bearing in the opposite end wall of said transmission housing, a roller bearing for said main shaft intermediate the ends thereof and axially separating said change speed gearing, a bevel gear keyed to said main shaft on one side of and adjacent to said roller bearing, and an output shaft extending normal to said main shaft and driven from said bevel gear.

5. In a transmission, a clutch shaft, a main shaft journalled at one end therein, an offset countershaft, a first gear train between said clutch shaft and countershaft, a second gear train between said main shaft and countershaft, a sliding clutch on said main shaft intermediate said gear trains, a bevel gear keyed on said main shaft rearwardly of said second gear train, and a normally extending output shaft having a bevel gear driven by said first bevel gear and of a diameter such as to be accommodated in the longitudinal space required by said gear trains and clutch.

6. The combination of claim 5 wherein said bevel gear on the output shaft has its end face recessed to allow the use of a gear on the main shaft of a radius greater than the distance between said main shaft and the end face plane of said bevel gear.

7. In a transmission, a housing having parallel end walls, a clutch shaft journalled in one end wall and having an expanded drive gear portion within the housing, a transmission main shaft journalled at one end in said drive gear portion and at the other end in the opposite end wall of said housing, a countershaft in said housing driven from said drive gear, axially spaced sets of gear trains between said countershaft and main shaft, a laterally directed output shaft extending into the side of said housing adjacent said drive gear portion of said clutch shaft, a bevel gear on the inner end thereof, and a bevel gear on said main shaft intermediate said gear trains for driving said output shaft bevel gear.

8. The transmission of claim 7 further characterized in the provision of means in said housing intermediate said end walls forming a journal support for said main shaft adjacent said bevel gear.

9. In a transmission, a housing having parallel end walls, a main shaft journalled at one end adjacent one end wall and at the opposite end in the opposite end wall, axially spaced gears on said shaft, clutch means axially slidable on said shaft for coupling said gears thereto, a laterally extending output shaft in one side wall of said transmission having a bevel gear on the inner end thereof facing one of said clutch means and its associated gear, and a bevel gear keyed to said main shaft intermediate said spaced gears and meshing with said first bevel gear.

ALFRED E. GRATER.
WALTER E. SCHIRMER.